(12) United States Patent
Tsukamoto et al.

(10) Patent No.: US 7,510,237 B2
(45) Date of Patent: Mar. 31, 2009

(54) STOPPER STRUCTURE OF SUN ROOF DEVICE

(75) Inventors: Hiroyuki Tsukamoto, Tochigi (JP); Kazutaka Sugimoto, Tochigi (JP); Masaharu Ohnishi, Saitama (JP); Keisuke Takayama, Saitama (JP); Michio Tamura, Saitama (JP); Akihiko Kuribayashi, Saitama (JP)

(73) Assignees: Yachiyo Kogyo Kabushiki Kaisya, Saitama (JP); Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 11/889,463

(22) Filed: Aug. 13, 2007

(65) Prior Publication Data
US 2008/0036246 A1    Feb. 14, 2008

(30) Foreign Application Priority Data
Aug. 11, 2006   (JP)   .............................. 2006-219235
Mar. 19, 2007   (JP)   .............................. 2007-070218

(51) Int. Cl.
*B60J 7/19* (2006.01)
*B60J 7/047* (2006.01)
(52) U.S. Cl. ................. 296/224; 296/216.03
(58) Field of Classification Search ............ 296/216.03, 296/224
See application file for complete search history.

(56) References Cited

U.S. PATENT DOCUMENTS

| 4,877,285 | A | * | 10/1989 | Huyer | ................... 296/216.03 |
| 5,618,081 | A | * | 4/1997 | Nabuurs | ................ 296/216.03 |
| 5,845,959 | A | * | 12/1998 | Ueki | .......................... 296/221 |
| 7,273,248 | B2 | * | 9/2007 | Boehm et al. | ............... 296/223 |

FOREIGN PATENT DOCUMENTS

JP          08-040077          2/1996

* cited by examiner

*Primary Examiner*—Dennis H Pedder
(74) *Attorney, Agent, or Firm*—Arent Fox LLP

(57) ABSTRACT

To provide a stopper structure of a sun roof device, in which the sun roof device has a front slider (20) and a driving slider (30) attached on a roof panel (4), a connecting link (40) attached to the front slider (20) and engaging with the driving slider (30), and a stopper member (60) adapted to stop the driving slider (30). When the roof panel (4) performs tilting operation, a first engaging portion (42) and a second engaging portion (43) of the connecting link (40) respectively engage with the a first cam (61) and a second cam (62) respectively formed on an upper surface and a lower surface of the stopper member (60), so that the movement of the front slider (20) in both the vehicle longitudinal direction and the vertical direction is restricted.

12 Claims, 9 Drawing Sheets

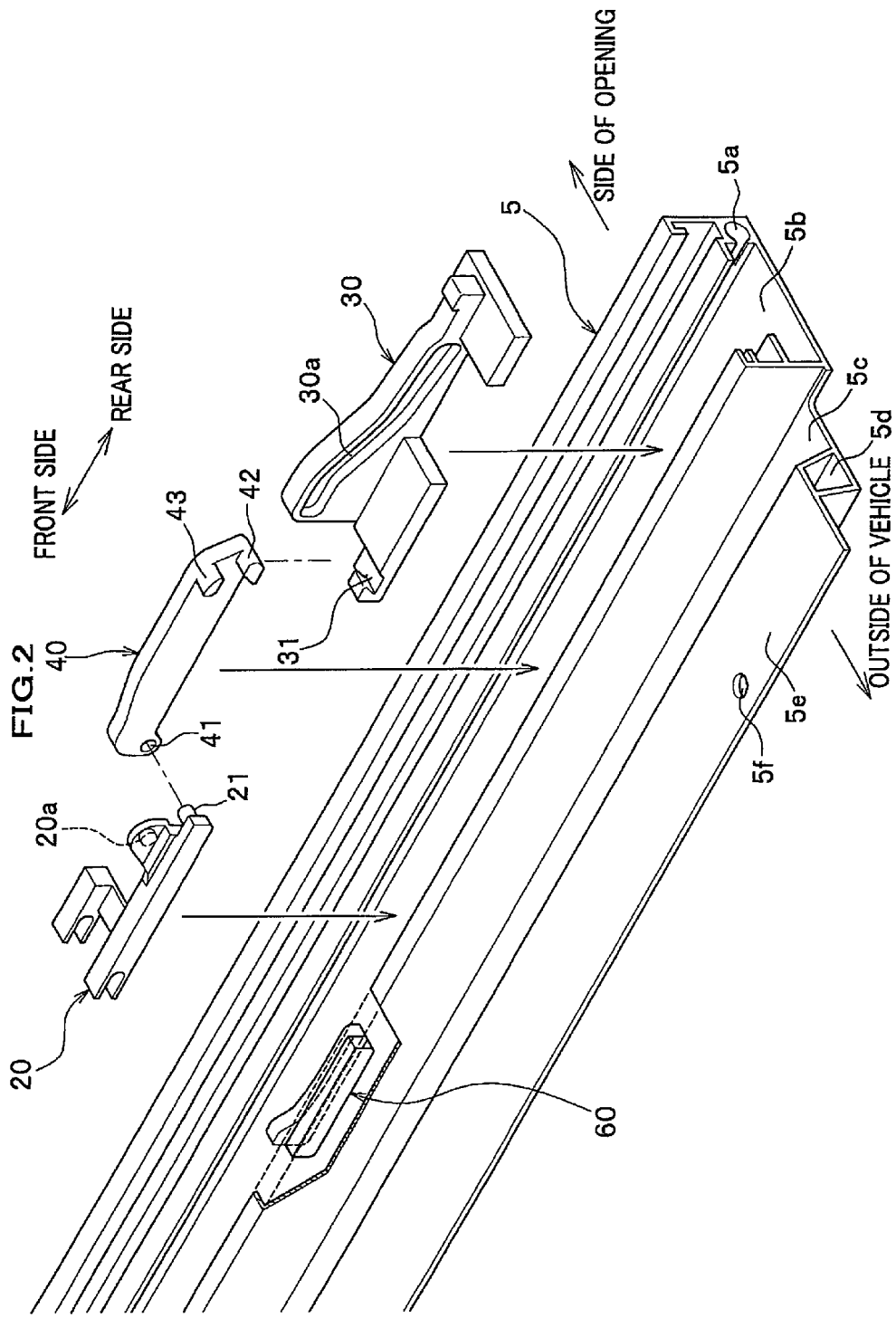

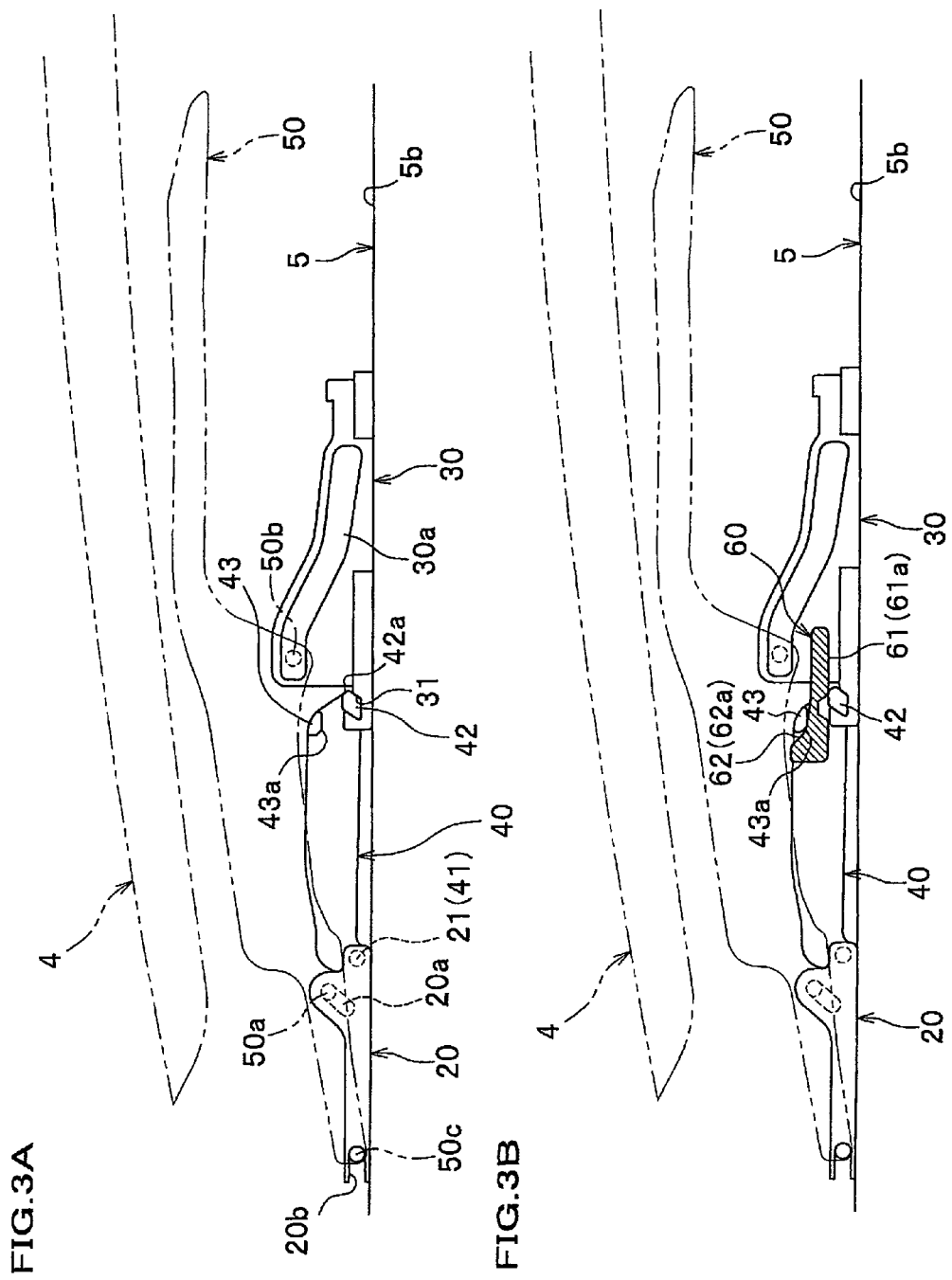

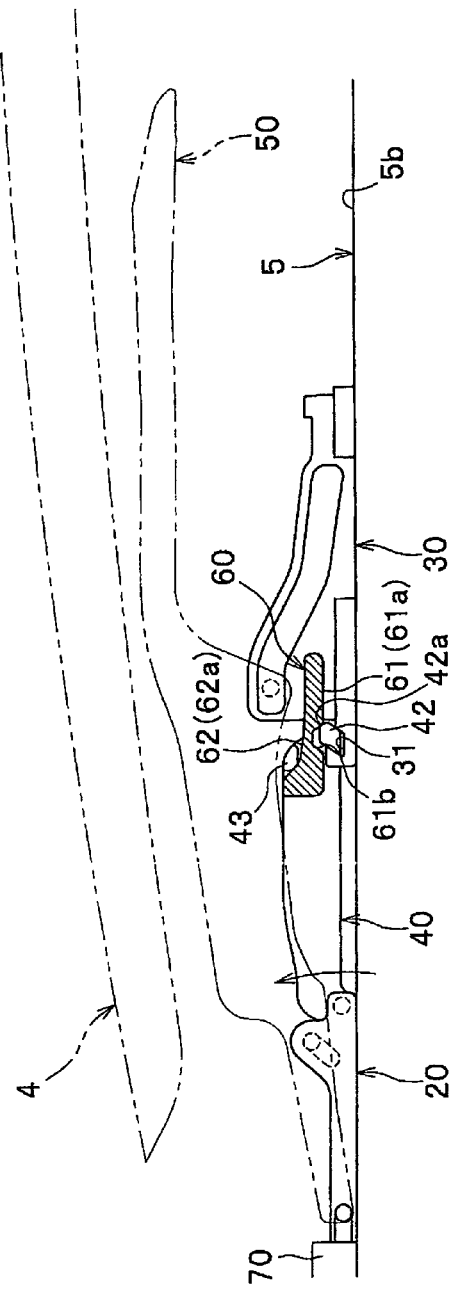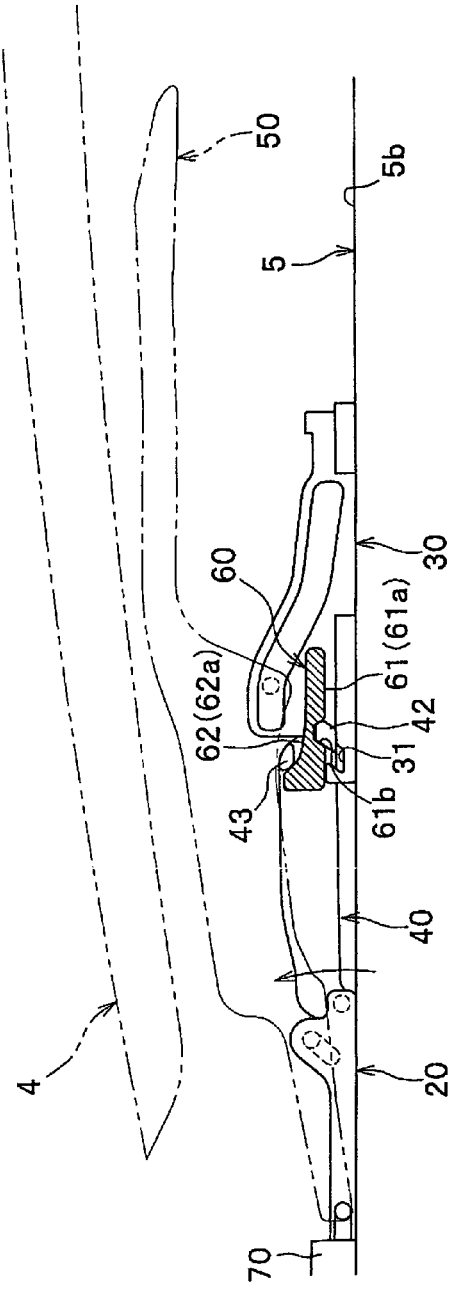

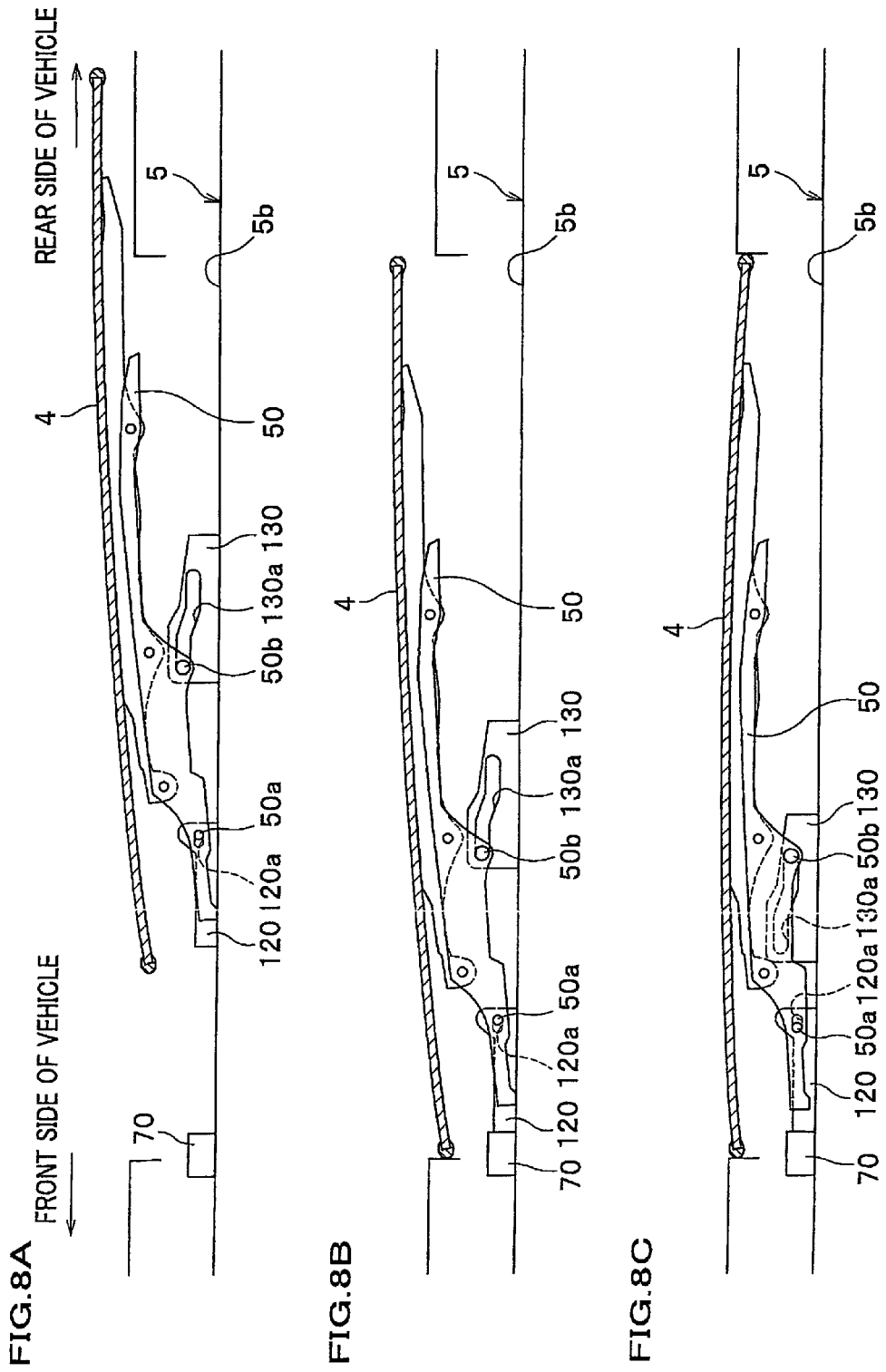

STOPPER STRUCTURE OF SUN ROOF DEVICE

CROSS-REFERENCE TO RELATED APPLICATION(S)

This application claims the foreign priority benefit under Title 35, United States Code, §119 (a)-(d), of Japanese Patent Application No. 2006-219235 filed on Aug. 11, 2006 and Japanese Patent Application No. 2007-70218 filed on Mar. 19, 2007 in the Japan Patent Office, the disclosure of which is herein incorporated by reference in its entirety.

BACKGROUND OF THE INVENTION

1. Field of the Invention

The present invention relates to a sun roof device of a vehicle.

2. Description of the Related Art

There has been known a conventional sun roof device of a vehicle having a roof panel mounted on an opening of a fixed roof, a slider attached on the roof panel and sliding in a vehicle longitudinal direction, and a guide frame for guiding the sliding movement of the slider.

In the aforesaid sun roof device, the roof panel is opened/closed in the following manner. As shown in FIG. 8A, a front slider 120 and a driving slider 130 are attached to a panel stay 50 attached on a lower surface of a side edge portion of a roof panel 4, the front slider 120 and the driving slider 130 sliding in the vehicle longitudinal direction within a guide rail 5b of a guide frame 5. The front slider 120 and the driving slider 130 are respectively formed with cam grooves 120a, 130a, and the panel stay 50 is formed with engaging pins 50a, 50b respectively engaged with the cam grooves 120a, 130a.

One end of a cable (not shown) that performs a push-pull operation is fixed to the driving slider 130. The driving slider 130 is slid by performing the push-pull operation of the cable, and the front slider 120 is slid due to being interlocked with the sliding movement of the driving slider 130.

Further, when the driving slider 130 slides toward the front side of the vehicle from an open state where the roof panel 4 is tilted up and disposed at the rear side of the vehicle (as shown in FIG. 8A), due to being interlocked with the driving slider 130, the front slider 120 is also slid toward the front side of the vehicle until the front slider 120 abuts on the a positioning member 70 provided in a front portion of the 5b so as to be stopped (as shown in FIG. 8B). From this state, when the driving slider 130 slides toward the front side of the vehicle, the engaging pins 50a, 50b of the panel stay 50 are moved within the cam grooves 120a, 130a of the front slider 120 and the driving slider 130, and the rear side of the panel stay 50 is lowered down and titled, so that roof panel 4 is brought into a full closed state as shown in FIG. 8C.

Further, there also has been known a conventional art which has a stopper structure added to the aforesaid sun roof device. The stopper structure serves as a stopper for stopping the front slider 120 when the roof panel 4 is tilted up and tilted down (both operations are hereinafter referred to as "tilting operation" according to circumstances).

In the aforesaid stopper structure of the sun roof device as shown in FIG. 9A, when the roof panel 4 is slid in the vehicle longitudinal direction, a front end 81 of a control member 80 attached on the driving slider 130 is engaged with a rear end 91 of a lock element 90 attached on the front slider 120, so that the front slider 120 is slid due to being interlocked with the sliding movement of the driving slider 130.

Further, as shown in FIG. 9B, when the roof panel performs the tilting operation, the engagement between the control member 80 and the lock element 90 is released, and the rear end 91 of the lock element 90 attached on the front slider 120 is engaged with a side wall of the guide rail 5b (a guiding rail), and therefore the movement of the front slider 120 in the vehicle longitudinal direction is restricted (according to Japanese Patent Publication No. 3505264, paragraph numbers 0016 to 0020, FIGS. 3 and 5, and the like).

However, in the aforesaid stopper structure, as shown in FIG. 9B, since a protruded portion 91a (a shoulder) protruding in the vehicle width direction from the rear end 91 of the lock element 90 of the front slider 120 is engaged with a recessed portion 5g (a recess) formed on an inner side surface of the guide rail 5b, the rear end 91 of the lock element 90 engaged with the guide rail 5b can be moved in the vertical direction, and therefore the front slider 120 may rattle in the vertical direction.

SUMMARY OF THE INVENTION

In view of the above problems, it is an object of the present invention to provide a stopper structure of a sun roof device in which, when performing a tilting operation of the roof panel, the movement of a front slider in both the vehicle longitudinal direction and the vertical direction can be restricted, therefore preventing rattling of the front slider.

A stopper structure of a sun roof device according to an aspect of the present invention is so configured that the sun roof device comprises a roof panel mounted on an opening of a fixed roof of a vehicle and a panel stay attached on the roof panel, and the stopper structure comprises a front slider attached to a front portion of the panel stay and sliding in the vehicle longitudinal direction; a driving slider attached to a rear portion of the panel stay and driven by a driving source to slide in a vehicle longitudinal direction, the driving slider having a recessed portion; a connecting link attached to the front slider and engaging with the driving slider, the connecting link having a first engaging portion and a second engaging portion; a guide frame for guiding the sliding movement of the front slider and the driving slider; and a stopper member attached on the guide frame and adapted to stop the driving slider, in which the recessed portion of the driving slider and the first engaging portion of the connecting link are detachably engaged with each other, in which, when the roof panel slides in the vehicle longitudinal direction, the connecting link and the driving slider are engaged with each other, so that the front slider slides in the vehicle longitudinal direction due to being interlocked with the sliding movement of the driving slider, and in which, when the roof panel is tilted up or tilted down, the engagement between the connecting link and the driving slider is released, the first engaging portion of the connecting link is engaged with a first cam formed on a lower surface of the stopper member, and the second engaging portion of the connecting link is engaged with a second cam formed on an upper surface of the stopper member, so that the movement of the front slider in both the vehicle longitudinal direction and a vertical direction is restricted.

According to such a configuration, when performing tilting operation of the roof panel, the first engaging portion and second engaging portion of the connecting link are respectively engaged with the first cam and second cam respectively formed on the lower surface and the upper surface of the stopper member, so that the movement of the front slider connected with the connecting link in both the vehicle longitudinal direction and the vertical direction can be restricted.

Thus, when performing tilting operation of the roof panel, rattling of the front slider can be prevented.

It is preferred that in the aforesaid stopper structure of the sun roof device, at lease a portion of the cam surface of each of the first cam and second cam of the stopper member is formed as a curved surface.

With such a configuration, since both the first engaging portion and second engaging portion of the connecting link can be gently displaced in the vertical direction respectively along the cam surfaces of the first cam and second cam, collision noise generated when the first engaging portion and second engaging portion slide against the cam surfaces of the first cam and second cam can be reduced, and engaging/disengaging noise generated when performing a tilting operation can be reduced.

It is preferred that in the aforesaid stopper structure of the sun roof device, the first engaging portion and second engaging portion of the connecting link are configured to respectively keep face contact with each of the cam surfaces of the first cam and second cam of the stopper member.

With such a configuration, since the first engaging portion and second engaging portion of the connecting link are respectively brought into face contact with the cam surfaces of the first cam and second cam of the stopper member, the first engaging portion and second engaging portion can stably move against the cam surfaces of the first cam and second cam, so that the tilt-sliding operation of the roof panel can be performed smoothly.

It is preferred that in the aforesaid stopper structure of the sun roof device further includes a biasing means for either biasing the second engaging portion of the connecting link toward the second cam of the stopper member or biasing the first engaging portion of the connecting link toward the first cam of the stopper member.

With such a configuration, since the biasing means biases the engaging portion of the connecting link to the cam of the stopper member, on which the engaging portion abuts the stopper member, the movement of the front slider connected with the connecting link in the vertical direction can be restricted. Thus, when performing tilting operation of the roof panel, the rattling of the front slider can be prevented.

It is preferred that in the aforesaid stopper structure of the sun roof device, the biasing means is provided with a spring portion formed on the connecting link and pressed by the front slider.

With such a configuration, since the biasing means including the spring portion, when performing tilting operation of the roof panel, the rattling of the front slider can be prevented with a simple structure.

BRIEF DESCRIPTION OF THE DRAWINGS

FIG. 2 is an exploded perspective view showing an tilt-sliding mechanism and a guide frame according to the first embodiment;

FIGS. 3A and 3B are side views showing the tilt-sliding mechanism and a stopper structure according to the first embodiment, in which FIG. 3A shows a roof panel in an open state and disposed at the rear side of a vehicle, and FIG. 3B shows a state where the roof panel is being slid toward the front side of the vehicle;

FIGS. 4A and 4B are side views showing the tilt-sliding mechanism and the stopper structure according to the first embodiment, in which FIG. 4A shows a state where a first engaging portion of a connecting link is being inserted into a recessed portion of a stopper member, and FIG. 4B shows a state where the first engaging portion of the connecting link is engaged to the recessed portion of the stopper member;

FIGS. 5A and 5B are side views showing the tilt-sliding mechanism and the stopper structure according to the first embodiment, in which FIG. 5A shows a state where the roof panel is being tilted down, and FIG. 5B shows a state where the roof panel is fully closed;

FIGS. 7A to 7C are side views showing a tilt-sliding mechanism and the stopper structure according to the second embodiment, in which FIG. 7A shows a state where the roof panel is being slid toward the front side of the vehicle, FIG. 7B shows a state where the first engaging portion of the connecting link is being inserted into the recessed portion of the stopper member, and FIG. 7C shows a state where the first engaging portion of the connecting link is engaged to the recessed portion of the stopper member;

FIGS. 8A to 8C are side views explaining the opening/closing operation of a roof panel of a sun roof device according to a prior art, in which FIG. 8A shows a state where the roof panel is being slid toward the front side of the vehicle, FIG. 8B shows a state where the roof panel is tilted up, and FIG. 8C shows a state where the roof panel is fully closed; and FIGS. 9A and 9B are plan views showing a stopper structure of the sun roof device according to the prior art, in which FIG. 9A shows a state where the roof panel is being slid in the vehicle longitudinal direction, and FIG. 9B shows a state where the tilting operation of the roof panel is being performed.

DETAILED DESCRIPTION OF PREFERRED EMBODIMENT(S)

First Embodiment

A first embodiment of the present invention will be described below with reference to the attached drawing.

The first embodiment will be described using an example in which the present invention is applied to a roof of a vehicle (an automobile). After describing the entire construction of a sun roof device, a stopper structure of the sun roof device will be described.

[Construction of Sun Roof Device]

Figure 1:
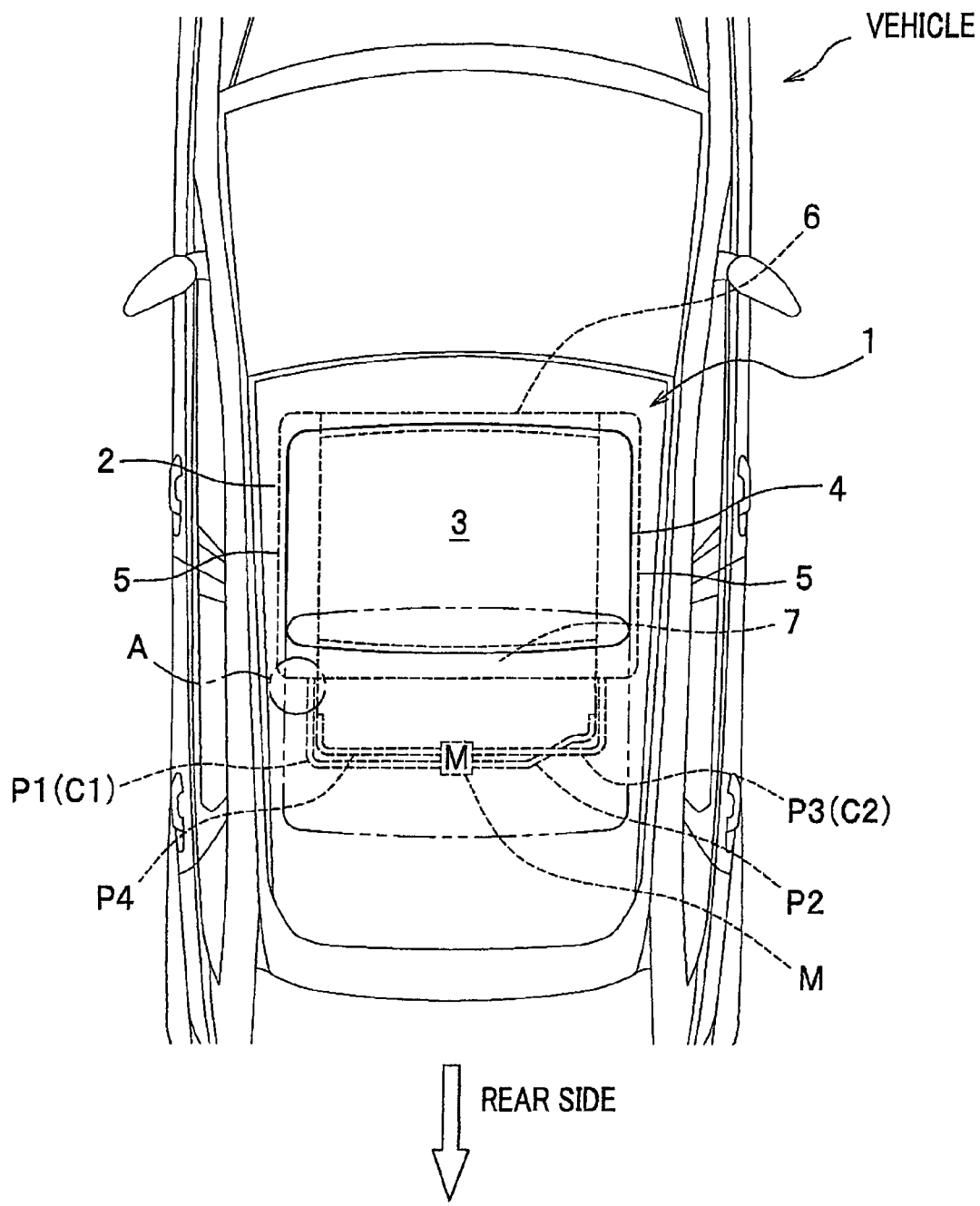
FIG. 1 is a plan view showing a sun roof device according to a first embodiment of the present invention.

FIG. 1 is a plan view showing the sun roof device according to the first embodiment of the present invention.

As shown in FIG. 1, a sun roof device 1 according to the first embodiment includes a roof panel 4 mounted on an opening 3 of a fixed roof 2 of the vehicle, a slider (not shown) attached on the roof panel 4 and being slid in the vehicle longitudinal direction to open/close the roof panel 4, a pair of cables C1, C2 connected to the slider to open/close the roof panel 4 by a push-pull operation, and a pair of guide frames 5, 5 for guiding the sliding movement of the slider.

[Construction of Roof Panel]

The roof panel 4 shown in FIG. 1 is made of glass. When in a closed state, the roof panel 4 closes the opening 3 of the fixed roof 2, and when in an open state, the roof panel 4 is tilted up and slid toward the rear side of the vehicle by a below-described tilt-sliding mechanism so that the roof panel 4 opens above the fixed roof 2.

Further, the pair of cables C1, C2 are attached on both side edges of the roof panel 4 through the tilt-sliding mechanism.

The cables C1, C2 perform push-pull operation simultaneously, so that the roof panel 4 is opened/closed while maintaining a stable posture.

[Construction of Guide Frame]

FIG. 2 is an exploded perspective view showing the tilt-sliding mechanism and the guide frame according to the first embodiment.

As shown in FIG. 1, in the sun roof device 1 of the first embodiment, the pair of guide frames 5, 5 extending in the vehicle longitudinal direction in a bilaterally symmetrical manner are attached below both side edges of the opening 3. Further, a front frame 6 connecting front ends of the guide frames 5, 5 is provided below a front edge of the opening 3, and a rear frame 7 connecting rear ends of the guide frames 5, 5 is provided below a rear edge of the opening 3.

Note that, in the sun roof device 1 according to the first embodiment, since the pair of guide frames 5, 5 are configured in a bilaterally symmetrical manner, description will only be given for the guide frame 5 arranged on the left side of the vehicle advancing direction in the following paragraphs, and description for the guide frame 5 arranged on the right side of the vehicle advancing direction will be omitted.

The guide frame 5 is formed as an extrusion of an aluminum alloy, for example. As shown in FIG. 2, the guide frame 5 includes, in order from the opening 3 side to the outside of the vehicle, a cable groove 5a through which the cable C1 is inserted, a guide rail 5b for guiding the sliding movement of a slider (a front slider 20 and a driving slider 30) of the below-described tilt-sliding mechanism, and drain groove 5c for draining rainwater and the like, each extending in the vehicle longitudinal direction. Further, in order to increase the rigidity of the guide frame 5, a hollow closed-sectional portion 5d extending in the vehicle longitudinal direction is provided on the drain groove 5c on the side facing the outside of the vehicle.

Further, a horizontal flanged portion 5e is provided along an upper edge of the guide frame 5 facing the outside of the vehicle. Formed on the flanged portion 5e is a mounting hole 5f in communication with a screw hole formed on a vehicle body (not shown). The guide frame 5 can be mounted on the vehicle body by inserting a bolt through the mounting hole 5f from the upper side of the flanged portion 5e and screwing the bolt into the screw hole formed on a vehicle body.

[Construction of Cables]

The cables C1, C2 shown in FIG. 1 are respectively attached on both side edges of the roof panel 4 through the below-described tilt-sliding mechanism. The roof panel 4 is opened/closed by simultaneously pushing/pulling the cables C1, C2.

The cables C1, C2 are inserted through a driving motor unit M arranged on the rear side of the opening 3. The cables C1, C2 are engaged with a pinion gear (not shown) inside the driving motor unit M, so that the push-pull operation of the cables C1, C2 can be accomplished by driving the driving motor unit M.

With respect to the cable C1, a first path (a drive path) for mounting the cable C1 on one side edge (on the left side as viewed in FIG. 1) of the roof panel 4 is inserted into a guide pipe P1 for guiding the cable C1, and a second path (an idling path) opposite to the first path is inserted into a guide pipe P2 for guiding a surplus length of the cable C1, the guide pipe P1 and the guide pipe P2 being separated from each other with the driving motor unit M as a boundary.

Similarly, with respect to the cable C2, a first path (a drive path) for mounting the cable C2 on the other side edge (on the right side as viewed in FIG. 1) of the roof panel 4 is inserted into a guide pipe P3, and a second path (an idling path) opposite to the first path is inserted into a guide pipe P4. The guide pipes P1, P2, P3, P4 are formed of, for example, aluminum or steel.

[Construction of Tilt-Sliding Mechanism]

Figure 5A:
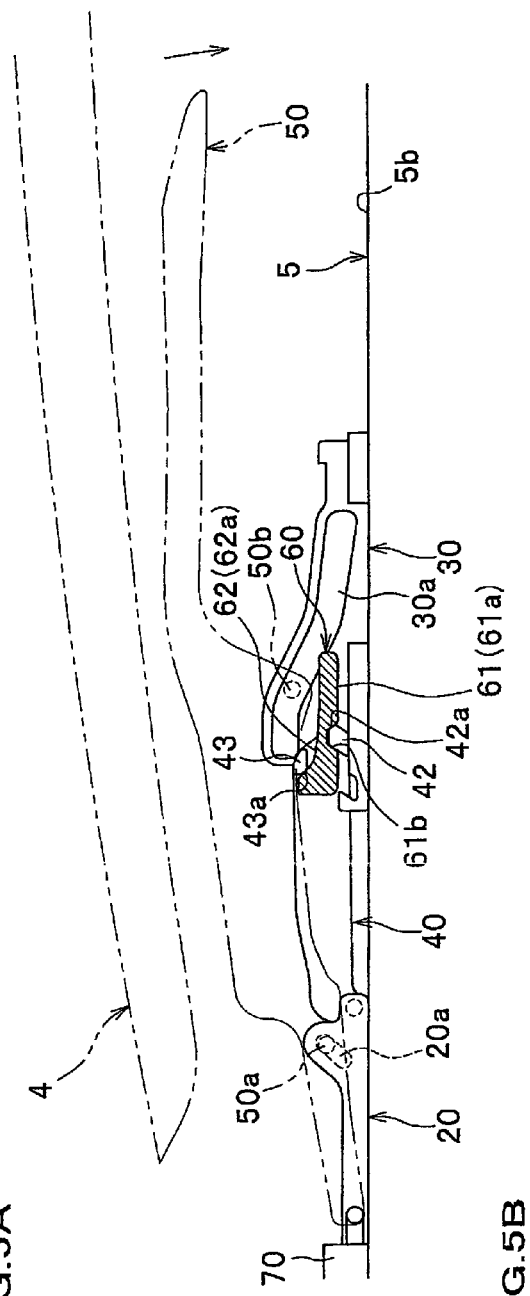
Figure 5B:
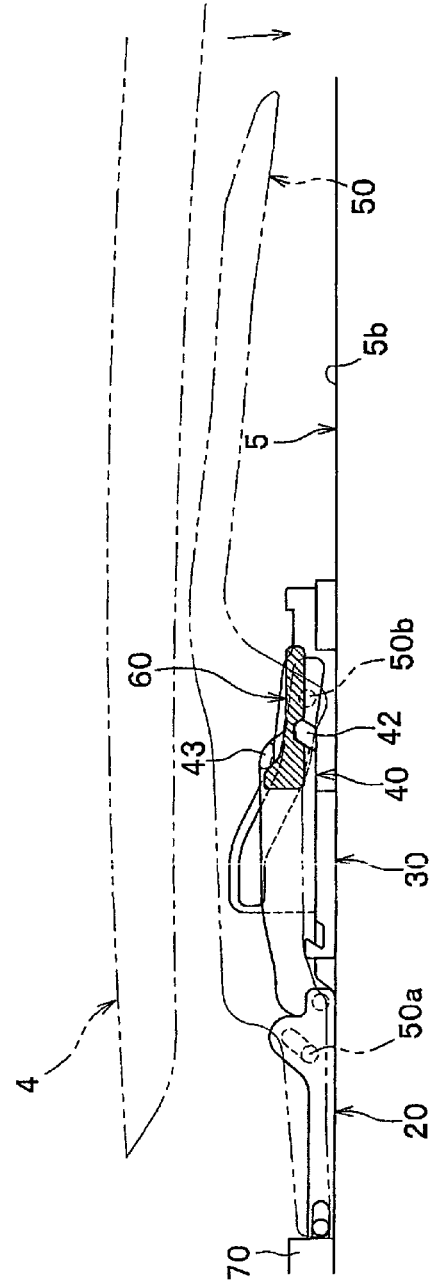

FIGS. 3A and 3B are side views showing the tilt-sliding mechanism and the stopper structure according to the first embodiment, in which FIG. 3A shows the roof panel in an open state and disposed at the rear side of the vehicle, and FIG. 3B shows a state where the roof panel is being slid toward the front side of the vehicle. FIGS. 4A and 4B are side views showing the tilt-sliding mechanism and the stopper structure according to the first embodiment, in which FIG. 4A shows a state where a first engaging portion of a connecting link is being inserted into a recessed portion of a stopper member, and FIG. 4B shows a state where the first engaging portion of the connecting link is engaged to the recessed portion of the stopper member. FIGS. 5A and 5B are side views showing the tilt-sliding mechanism and the stopper structure according to the first embodiment, in which FIG. 5A shows a state where the roof panel is being tilted down, and FIG. 5B shows a state where the roof panel is fully closed.

In the sun roof device 1 according to the first embodiment, the tilt-sliding mechanism, which serves both as a tilting mechanism and as a sliding mechanism, is provided for each of the guide frames 5, 5. As shown in FIG. 3, the tilt-sliding mechanism includes a panel stay 50 attached on the roof panel 4, the front slider 20 and the driving slider 30 respectively attached on the front lower side and on the rear lower side of the panel stay 50 to be slid within the guide rail 5b of the guide frame 5 in the vehicle longitudinal direction, and a connecting link 40 attached on the front slider 20 and detachably attached to the driving slider 30.

Note that, since the tilt-sliding mechanisms arranged in both of the guide frames 5, 5 have the same construction, description will only be given for the tilt-sliding mechanism arranged on the left side of the vehicle advancing direction in the following paragraphs, and description for the tilt-sliding mechanism arranged on the right side of the vehicle advancing direction will be omitted.

The front slider 20 and the driving slider 30 are respectively formed with cam grooves 20a, 30a, and the panel stay 50 is formed with engaging pins 50a, 50b respectively engaged with the cam grooves 20a, 30a. Further, a connecting groove 20b is formed on a front end surface of the front slider 20. A connecting shaft 50c provided at a front end of the panel stay 50 is engaged with the connecting groove 20b. Further, the panel stay 50 is attached on a lower surface of the side edge of the roof panel 4 through a panel supporting bracket (not shown).

One end of the cable C1 (see FIG. 1) which performs a push-pull operation is fixed to the driving slider 30. By performing the push-pull operation of the cable C1, the driving slider 30 slides along the guide rail 5b in the vehicle longitudinal direction. Further, since the front slider 20 is connected with the driving slider 30 through the panel stay 50 and the connecting link 40, the front slider 20 also slides in the vehicle longitudinal direction, interlocking with the sliding movement of the driving slider 30.

The opening/closing operation of the roof panel 4 performed by the tilt-sliding mechanism will be described below.

FIG. 3A shows the roof panel 4 in an open state where the roof panel 4 is tilted up and disposed at the rear side of the vehicle, and the rear side of the roof panel 4 overlaps the fixed roof 2 (see FIG. 1). When the driving slider 30 is slid toward the front side of the vehicle by the cable C1, the front slider 20

(which is connected with the driving slider 30 through the panel stay 50 and the connecting link 40) and the roof panel 4 slide toward the front side of the vehicle due to being interlocked with the driving slider 30, and the front slider 20 slides until abutting on the a positioning member 70 provided in the front portion of guide rail 5b (see FIG. 4A).

From this state, as shown in FIG. 5A, when the driving slider 30 slides toward the front side of the vehicle, the engaging pins 50a, 50b of the panel stay 50 are moved within the cam grooves 20a, 30a of the front slider 20 and the driving slider 30, so that the rear side of the panel stay 50 is lowered down and titled. Thus, as shown in FIG. 5B, the roof panel 4 is tilted down and brought into a full closed state, so that the opening 3 (see FIG. 1) is closed.

[Construction of Stopper Structure of Sun Roof Device]

The stopper structures, which serve to stop the front sliders 20, of the sun roof device 1 of the first embodiment will be described below.

Note that, since the stopper structures of the sun roof device 1 of the first embodiment are configured in a bilaterally symmetrical manner, description will only be given for the stopper structure arranged on the left side of the vehicle advancing direction in the following paragraphs, and description for the stopper structure arranged on the right side of the vehicle advancing direction will be omitted.

First, the stopper structure of the sun roof device 1 will be briefly described below.

As shown in FIG. 2, in the sun roof device 1 according to the first embodiment, the connecting link 40 is provided between the front slider 20 and the driving slider 30. The connecting link 40 has its front end rotatably fixed to the rear end of the front slider 20, and has its rear end detachably engaged with the front end of the driving slider 30.

Further, as shown in FIG. 3A, when the roof panel 4 slides in the vehicle longitudinal direction, the connecting link 40 is engaged with the driving slider 30, so that the front slider 20 slides due to being interlocked with the sliding movement of the driving slider 30.

Further, as shown in FIG. 5A, when the roof panel 4 performs a tilting operation, the engagement between the connecting link 40 and the driving slider 30 is released, so that only the driving slider 30 can be moved in the vehicle longitudinal direction.

Next, each element of the stopper structure of the sun roof device 1 will be described in detail below.

As shown in FIGS. 2 and 3A, the connecting link 40 extends in the vehicle longitudinal direction, and the front end of the connecting link 40 is formed with a mounting hole 41 bored in the vehicle width direction. On the other hand, the rear end of the front slider 20 is provided with a rotating shaft 21 protruding in the vehicle width direction. The rotating shaft 21 is inserted through the mounting hole 41 of the connecting link 40, so that the connecting link 40 can rotate around the rotating shaft 21.

Further, the rear end of the connecting link 40 is provided with a first engaging portion 42 and a second engaging portion 43 both protruding toward the outside of the vehicle. The first engaging portion 42 is arranged at the rear lower portion of the connecting link 40, and the second engaging portion 43 is arranged at the rear upper portion of the connecting link 40. Also, the second engaging portion 43 is arranged slightly closer to the front side of the vehicle than the first engaging portion 42.

The first engaging portion 42 has a substantially rhombic shape in side view. The first engaging portion 42 has an upper surface, a lower surface, a front surface and a rear surface, in which the upper and lower surfaces extend horizontally, and the front and rear surfaces incline to the rear side of the vehicle. Further, a cutout surface 42a is formed on a rear upper corner of the first engaging portion 42.

The lower portion of the first engaging portion 42 can be engaged with a recessed portion 31 formed at the front end of the driving slider 30. The recessed portion 31 of the driving slider 30 is formed to be engaged with the lower portion of the first engaging portion 42. A bottom surface of the recessed portion 31 extends horizontally, and a front surface and a rear surface incline to the rear side of the vehicle.

The second engaging portion 43 has a convex surface gently curved from its front face to its lower face and a convex surface gently curved from its upper face to its rear face. The convex surface curved from the front face to the lower face serves as a contact surface 43a, which slides while keeping face contact with the a cam surface 62a of a second cam 62 of a stopper member 60 (all of these will be described later).

The stopper member 60 shown in FIG. 3B is a plate-like member fixed to the guide rail 5b on its upper end closer to the outside of the vehicle, the stopper member 60 protruding from the outside of the vehicle toward the opening 3 (see FIG. 2) side. A cam surface 61a is formed on the lower surface of the stopper member 60, and a cam surface 62a of the second cam 62 is formed on the upper surface of the stopper member 60.

Further, when the connecting link 40 slides toward the front portion of the guide rail 5b, the stopper member 60 is inserted between the first engaging portion 42 and second engaging portion 43 of the connecting link 40, and the first engaging portion 42 and second engaging portion 43 respectively abut on the cam surfaces 61a, 62a. In this manner, the first engaging portion 42 and second engaging portion 43 are respectively engaged with the first cam 61 and second cam 62.

As shown in FIG. 4A, the first engaging portion 42 abuts on and slides against the cam surface 61a of the first cam 61. The cam surface 61a is formed with a recessed portion 61b on its horizontal portion extending in the vehicle longitudinal direction. The recessed portion 61b is formed at such a position and in such a shape that, when the front slider 20 is moved to a foremost advanced position and is stopped at that position, the upper portion of the first engaging portion 42 of the connecting link 40 can be inserted into the recessed portion 61b, and the upper portion of the first engaging portion 42 can be engaged with the recessed portion 61b (see FIG. 4B).

In other words, the rear surface of the recessed portion 61b is inclined at a degree identical to the degree at which the cutout surface 42a is inclined. Thus, when the first engaging portion 42 is engaged with/disengaged from the recessed portion 61b, the cutout surface 42a of the first engaging portion 42 slides while keeping face contact with the rear surface of the recessed portion 61b.

Further, the corner changing from the horizontal portion of the cam surface 61a on the rear side of the vehicle to the rear surface of the recessed portion 61b is formed as a curved surface. Thus, when the first engaging portion 42 is engaged with/disengaged from the recessed portion 61b, the first engaging portion 42 can be moved gently along the curved surface.

The second engaging portion 43 abuts on and slides against the cam surface 62a of the second cam 62. As shown in FIG. 3B, the cam surface 62a is formed as a curved surface having a gentle curvature at which the curved surface gradually lowers from the front side to the rear side of the vehicle. Incidentally, the curvature of the cam surface 62a and the curvature of the contact surface 43a of the second engaging portion 43 are respectively predetermined so that the contact surface 43*a* slides while keeping face contact with the a cam surface 62*a*.

The operation of each portion of the stopper structure when opening/closing the roof panel 4 will be described below based on the closing operation of the roof panel 4.

As shown in FIG. 3A, in the state where the tilted up roof panel 4 is disposed at the rear side of the vehicle, the first engaging portion 42 of the connecting link 40 is engaged with the recessed portion 31 of the driving slider 30.

As shown in FIG. 3B, when the driving slider 30 is slid toward the front side of the vehicle by the cable C1, the front slider 20 (which is connected with the driving slider 30 through the panel stay 50 and the connecting link 40) slides toward the front side of the vehicle due to being interlocked with the driving slider 30.

Further, when the connecting link 40 slides toward the front portion of the guide rail 5*b*, the stopper member 60 is inserted between the first engaging portion 42 and second engaging portion 43 of the connecting link 40, and the first engaging portion 42 and second engaging portion 43 respectively abut on the cam surfaces 61*a*, 62*a* of the first cam 61 and second cam 62 of the stopper member 60, thereby the first engaging portion 42 and second engaging portion 43 are respectively engaged with the first cam 61 and second cam 62.

Further, as shown in FIG. 4A, when the front slider 20 reaches the front end of the guide rail 5*b*, the front slider 20 abuts on the positioning member 70 so as to be stopped. From this state, when the driving slider 30 slides toward the front side of the vehicle, the first engaging portion 42 of the connecting link 40 engaged with the recessed portion 31 of the driving slider 30 is pushed upward along the front surface and the rear surface of the recessed portion 31.

Further, the rear portion of the connecting link 40 is lifted up and tilted by the force exerted on the first engaging portion 42, and the first engaging portion 42 is pushed out from the recessed portion 31 as the connecting link 40 is tilted, so that the engagement between the driving slider 30 and the connecting link 40 is released.

As shown in FIG. 4B, the upper portion of the first engaging portion 42 pushed out from the recessed portion 31 is inserted into the recessed portion 61*b* of the first cam 61 of the stopper member 60, so that the first engaging portion 42 is engaged with the recessed portion 61*b*, and thereby not only the movement of the connecting link 40 in the vehicle longitudinal direction is restricted, but also the movement of the front slider 20 connected to the connecting link 40 in the vehicle longitudinal direction is restricted.

Further, the second engaging portion 43 of the connecting link 40 is lifted up along the cam surface 62*a* of the second cam 62 of the stopper member 60 as the connecting link 40 is tilted, so that the engagement between the second cam 62 and the second engaging portion 43 is maintained.

Since the second engaging portion 43 is engaged with the second cam 62 formed on the upper surface of the stopper member 60, and since the first engaging portion 42 is engaged with the first cam 61 formed on the lower surface of the stopper member 60, not only the movement of the connecting link 40 in the vertical direction is restricted by the stopper member 60 sandwiched between the first engaging portion 42 and the second engaging portion 43, but also the movement of the front slider 20 connected to the connecting link 40 in the vertical direction is restricted.

Further, as shown in FIG. 5A, when the driving slider 30 slides toward the front side of the vehicle, the rear portion of the panel stay 50 is lowered down as explained when describing the construction of the tilt-sliding mechanism, and the roof panel 4 is tilted down into a full closed state as shown in FIG. 5B.

[Advantages of Stopper Structure]

As explained above when describing the stopper structure of the sun roof device 1, when performing the tilting operation of the roof panel 4 as shown in FIG. 5A, the first engaging portion 42 and second engaging portion 43 of the connecting link 40 are respectively engaged with the first cam 61 and second cam 62 formed on the lower surface and the upper surface of the stopper member 60, so that not only the movement of the connecting link 40 in both the vehicle longitudinal direction and the vertical direction can be restricted, but also the movement of the front slider 20 connected to the connecting link 40 in both the vehicle longitudinal direction and the vertical direction can be restricted. Thus, when performing tilting operation of the roof panel 4, rattling of the front slider 20 can be prevented, thereby improving the quality of the sun roof device 1 (see FIG. 1).

Further, since the corner portion of the recessed portion 61*b* of the first cam 61 of the stopper member 60 and the cam surface 62*a* of the second cam 62 are formed as curved surfaces, the first engaging portion 42 and second engaging portion 43 of the connecting link 40 can be gently displaced in the vertical direction respectively along the cam surfaces 61*a*, 62*a* of the first cam 61 and second cam 62, so that collision noise generated when the first engaging portion 42 and second engaging portion 43 slide against the cam surfaces 61*a*, 62*a* of the first cam 61 and second cam 62 can be reduced, and engaging/disengaging noise generated when performing the tilting operation can be reduced.

Further, since the first engaging portion 42 and second engaging portion 43 of the connecting link 40 are respectively brought into face contact with the cam surfaces 61*a*, 62*a* of the first cam 61 and second cam 62 of the stopper member 60, the first engaging portion 42 and second engaging portion 43 can stably move against the cam surfaces 61*a*, 62*a* of the first cam 61 and second cam 62, so that the tilt-sliding operation of the roof panel can be performed smoothly.

Second Embodiment

A second embodiment of the present invention will be described below with reference to FIG. 6 and FIGS. 7A to 7C.

Figure 6:
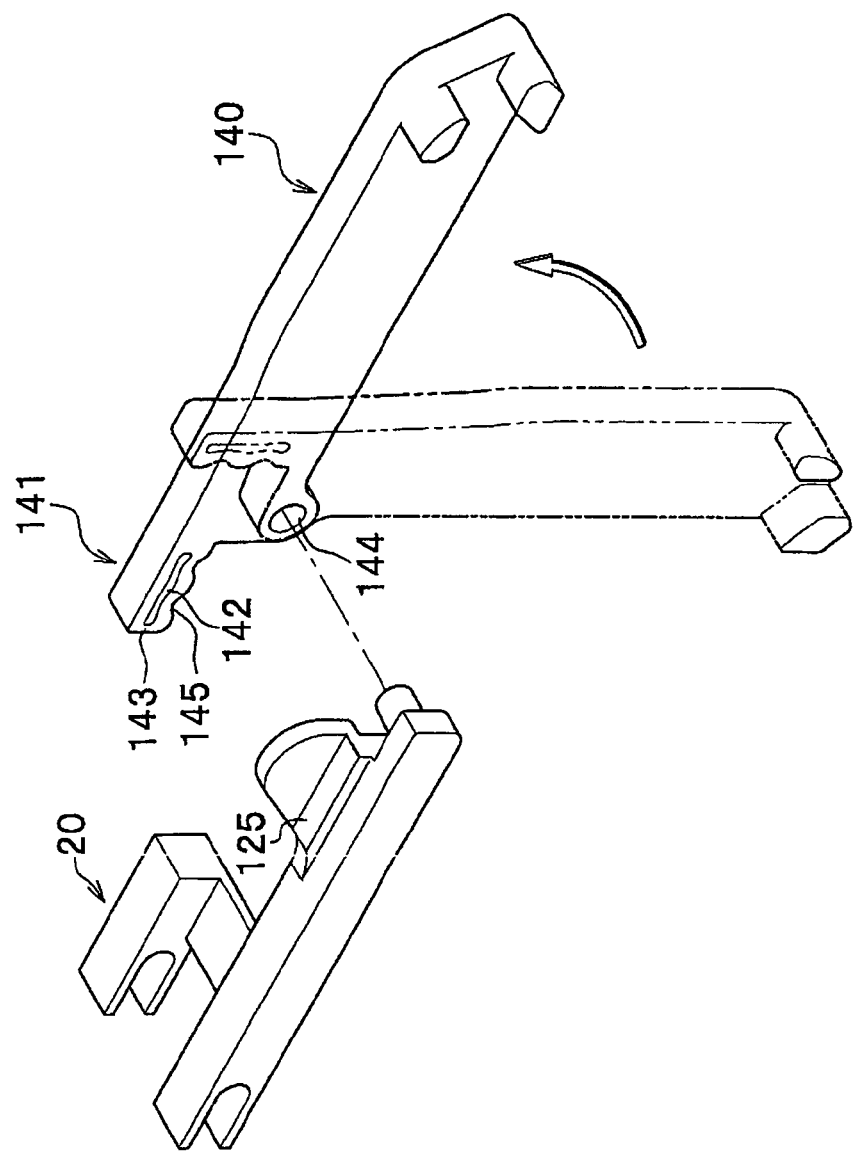
FIG. 6 is a view explaining steps of mounting a connecting link 140 to a front slider 20 according to a second embodiment of the present invention.
Figure 7A:
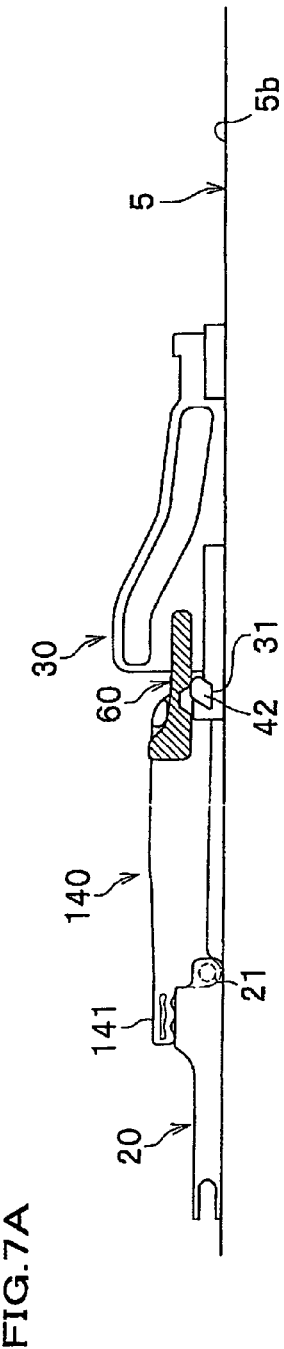
Figure 7B:
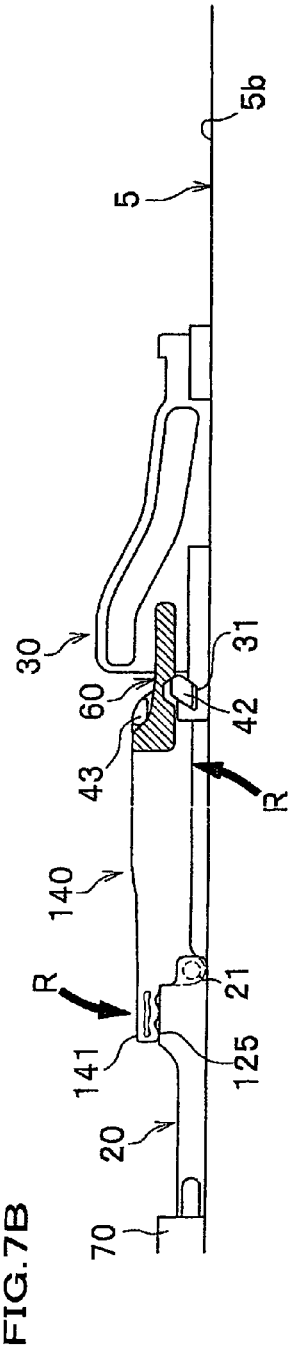
Figure 7C:
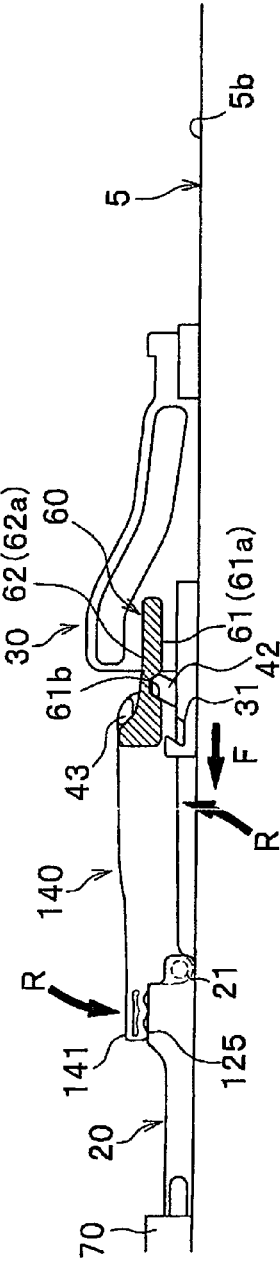
Figure 9A:
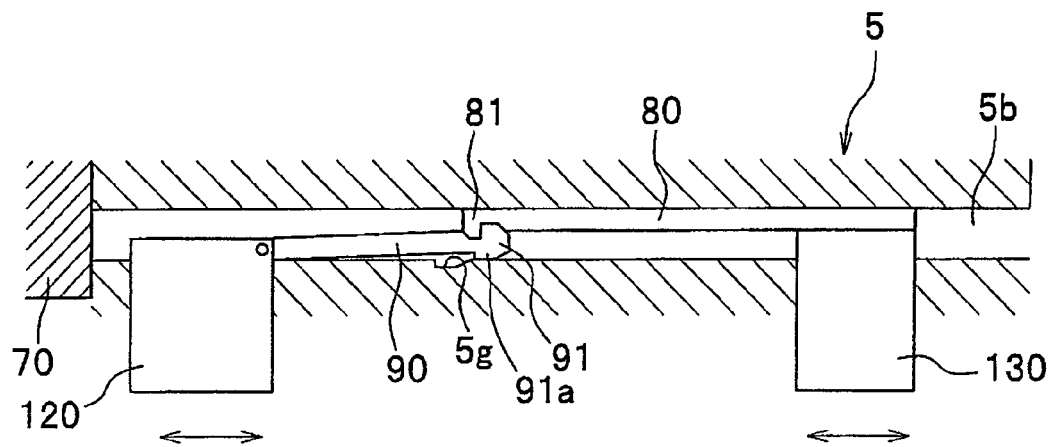
Figure 9B:
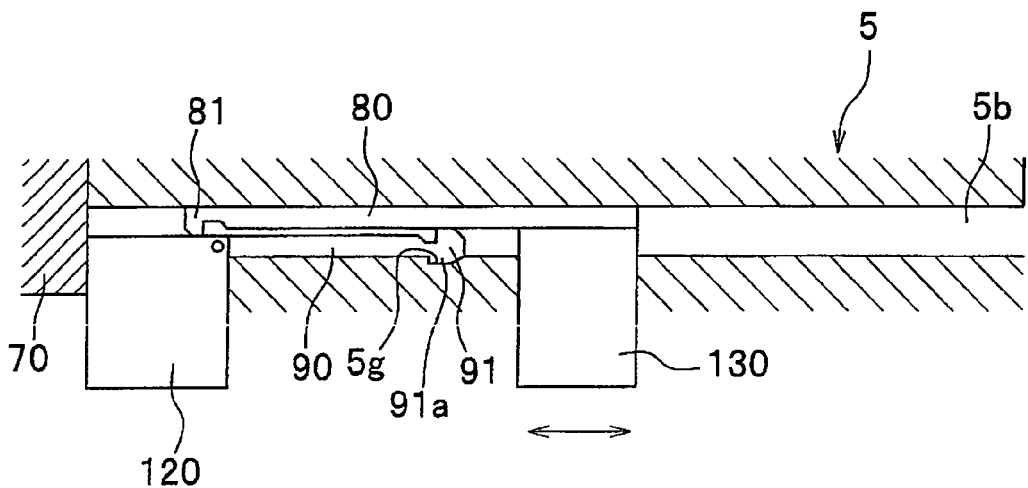

FIG. 6 is a view explaining steps of mounting a connecting link to a front slider according to the second embodiment of the present invention. FIGS. 7A to 7C are side views explaining the function of the connecting link of the second embodiment and showing the tilt-sliding mechanism and the stopper structure, in which FIG. 7A shows a state where the roof panel is being slid toward the front side of the vehicle, FIG. 7B shows a state where the first engaging portion of the connecting link is being inserted into the recessed portion of the stopper member, and FIG. 7C shows a state where the first engaging portion of the connecting link is engaged to the recessed portion of the stopper member.

A connecting link 140 (see FIG. 6) extends in the vehicle longitudinal direction and has the same function as the connecting link 40 of the first embodiment (see FIGS. 2 and 3A). The connecting link 140 is formed by adding a spring portion 141 to the connecting link 40, the spring portion 141 extending toward the side of the front slider 20. Note that the connection and the movement relationships between the connecting link 14, the front slider 20 and the driving slider 30 are identical to those of the first embodiment, and therefore the description thereof will not be repeated in the following paragraphs. Therefore a description will only be given with respect to the construction and function of the newly added spring portion 141.

The connecting link 140 of the second embodiment is formed by extending one end (which is the end faces the front slider) of the connecting link 40 to form an extended portion, and the spring portion 141 is formed on the extended portion. The spring portion 141 includes a hollow portion 142 which only opens to one side surface. The spring portion 141 has a substantially frame-like portion 143 surrounding the hollow portion 142. The frame-like portion 143 has spring effect because it is displaced toward the side of the hollow portion 142 when a pressing force is exerted on the spring portion 141.

As shown in FIG. 6, the connecting link 140 is oriented so that its longitudinal direction is vertical (in a state as shown by the chain double-dashed line), and the rotating shaft 21 formed at the rear end of the front slider 20 is inserted into the mounting hole 144 of the connecting link 140. Then the connecting link 140 is turned back so that a lower surface 145 of the spring portion 141 abuts on a receiving surface 125 of the front slider, and thereby the connecting link 140 is attached to the front slider 20.

The lower surface 145, on which the spring portion 141 abuts the receiving surface 125, has a wave-like cross section, so that the pressing force exerted on the spring portion 141 is locally high, thereby improving the spring effect.

The operation of the spring portion 141 when opening/closing the roof panel 4 will be described below based on the closing operation of the roof panel 4.

As shown in FIG. 7A, in the state where the tilted up roof panel 4 is disposed at the rear side of the vehicle, the first engaging portion 42 of the connecting link 140 is engaged with the recessed portion 31 of the driving slider 30.

As shown in FIG. 7B, when the front slider 20 reaches the front end of the guide rail 5b, the front slider 20 abuts on the positioning member 70 so as to be stopped. From this state, when the driving slider 30 slides toward the front side of the vehicle, the first engaging portion 42 of the connecting link 140 engaged with the recessed portion 31 of the driving slider 30 is pushed upward along the front surface and the rear surface of the recessed portion 31.

Further, the rear portion of the connecting link 140 is lifted up and tilted by the force exerted on the first engaging portion 42, and the first engaging portion 42 is pushed out from the recessed portion 31 as the connecting link 140 is tilted, so that the engagement between the driving slider 30 and the connecting link 140 is released.

When the rear portion of the connecting link 140 is lifted up and tilted, the connecting link 140 is rotated in the counterclockwise direction (indicated by arrow R) as viewed in the drawings with the rotating shaft 21 as a rotating center. At this time, since being pressed toward the side of the receiving surface 125 of the front slider 20, the spring portion 141 has a reaction force in the clockwise direction with the rotating shaft 21 as a rotating center (namely, in the direction reverse to the direction indicated by arrow R) acted on the front slider 20, so that the movement of the front slider 20 in the vertical direction can be restricted.

Further, as shown in FIG. 7C, when the driving slider 30 slides toward the front side of the vehicle (namely, when the driving slider 30 slides in the direction indicated by the arrow F), the upper portion of the first engaging portion 42 pushed out from the recessed portion 31 is inserted into the recessed portion 61b of the first cam 61 of the stopper member 60, so that the first engaging portion 42 is engaged with the recessed portion 61b, and thereby not only the movement of the connecting link 140 in the vehicle longitudinal direction is restricted, but also the movement of the front slider 20 connected to the connecting link 140 in the vehicle longitudinal direction is restricted.

At this time, the second engaging portion 43 of the connecting link 140 is lifted up along the cam surface 62a of the second cam 62 of the stopper member 60 as the connecting link 140 is tilted, so that the engagement between the second cam 62 and the second engaging portion 43 is maintained.

Since the second engaging portion 43 is lifted up, the connecting link 140 is rotated in the counterclockwise direction (indicated by arrow R) as viewed in the drawings with the rotating shaft 21 as a rotating center. At this time, since being pressed toward the side of the receiving surface 125 of the front slider 20, the spring portion 141 has a reaction force in the clockwise direction with the rotating shaft 21 as a rotating center (namely, in the direction reverse to the direction indicated by arrow R) acted on the front slider 20, so that the movement of the front slider 20 in the vertical direction can be restricted.

In the second embodiment, since the spring portion 141 for pressing the front slider 20 is formed on the connecting link 140, when performing the tilting operation of the roof panel, the movement of the front slider connected to the connecting link in the vertical direction can be restricted. Thus, when performing the tilting operation of the roof panel, rattling of the front slider can be prevented, thereby improving the quality of the sun roof device.

[Modifications]

Although the present invention is described based on the first embodiment and the second embodiment, it is to be understood that the present invention is not limited to the embodiments described above, and various modifications in design can be made without departing from the spirit and scope of the present invention. For example, the shapes of the first cam 61 and second cam 62 of the stopper member 60 and the first engaging portion 42 and second engaging portion 43 of the connecting link 40 (see FIG. 3B) do not have to be limited to those described in the above embodiments, but can be others as long as the connecting link 40 can be securely engaged with/disengaged from the driving slider 30 and the stopper member 60 when performing the tilting operation of the roof panel 4.

Further, although the tilt-sliding operation of the roof panel 4 is described based on the closing operation of the roof panel 4 (as shown in FIGS. 3A, 3B, 4A, 4B, 5A, 5B, 7A, 7B and 7C) in the above embodiments, the opening operation of the roof panel 4 can be accomplished by performing an operation reverse to the closing operation.

Further, although the guide frame 5 of the embodiments includes the cable groove 5a, the guide rail 5b, the drain groove 5c, the hollow closed-sectional portion 5d and the flanged portion 5e (as shown in FIG. 2), the guide frame 5 also can include at least the cable groove 5a and the guide rail 5b, and presence/absence and shape of the other portions are not particularly limited.

Further, although the embodiments are described based on an outer slide type sun roof device 1, the present invention also can be applied to an inner slide type sun roof device, in which the roof panel 4 is opened in a tilted down state.

What is claimed is:

1. A stopper structure of a sun roof device having a roof panel mounted on an opening of a fixed roof of a vehicle and a panel stay attached on the roof panel, the stopper structure comprising:

a front slider attached to a front portion of the panel stay and sliding in the vehicle longitudinal direction;

a driving slider attached to a rear portion of the panel stay and driven by a driving source to slide in a vehicle longitudinal direction, the driving slider having a recessed portion;

a connecting link attached to the front slider and engaging with the driving slider, the connecting link having a first engaging portion and a second engaging portion;

a guide frame for guiding the sliding movement of the front slider and the driving slider; and a stopper member attached on the guide frame and adapted to stop the driving slider;

wherein the recessed portion of the driving slider and the first engaging portion of the connecting link are detachably engaged with each other, wherein, when the roof panel slides in the vehicle longitudinal direction, the connecting link and the driving slider are engaged with each other, so that the front slider slides in the vehicle longitudinal direction due to being interlocked with the sliding movement of the driving slider, and wherein, when the roof panel is tilted up or tilted down, the engagement between the connecting link and the driving slider is released, the first engaging portion of the connecting link is engaged with a first cam formed on a lower surface of the stopper member, and the second engaging portion of the connecting link is engaged with a second cam formed on an upper surface of the stopper member, so that the movement of the front slider in both the vehicle longitudinal direction and a vertical direction is restricted.

2. The stopper structure of the sun roof device according to claim 1,
wherein at least a portion of the cam surface of each of the first cam and the second cam of the stopper member is formed as a curved surface.

3. The stopper structure of the sun roof device according to claim 1,
wherein the first engaging portion and second engaging portion of the connecting link are configured to respectively keep face contact with each of the cam surfaces of the first cam and second cam of the stopper member.

4. The stopper structure of the sun roof device according to claim 2,
wherein the first engaging portion and second engaging portion of the connecting link are configured to respectively keep face contact with each of the cam surfaces of the first cam and second cam of the stopper member.

5. The stopper structure of the sun roof device according to claim 1, further comprising a biasing means for either biasing the second engaging portion of the connecting link toward the second cam of the stopper member or biasing the first engaging portion of the connecting link toward the first cam of the stopper member.

6. The stopper structure of the sun roof device according to claim 2, further comprising a biasing means for either biasing the second engaging portion of the connecting link toward the second cam of the stopper member or biasing the first engaging portion of the connecting link toward the first cam of the stopper member.

7. The stopper structure of the sun roof device according to claim 3, further comprising a biasing means for either biasing the second engaging portion of the connecting link toward the second cam of the stopper member or biasing the first engaging portion of the connecting link toward the first cam of the stopper member.

8. The stopper structure of the sun roof device according to claim 4, further comprising a biasing means for either biasing the second engaging portion of the connecting link toward the second cam of the stopper member or biasing the first engaging portion of the connecting link toward the first cam of the stopper member.

9. The stopper structure of the sun roof device according to claim 5,
wherein the biasing means is provided with a spring portion formed on the connecting link and pressed by the front slider.

10. The stopper structure of the sun roof device according to claim 6,
wherein the biasing means is provided with a spring portion formed on the connecting link and pressed by the front slider.

11. The stopper structure of the sun roof device according to claim 7,
wherein the biasing means is provided with a spring portion formed on the connecting link and pressed by the front slider.

12. The stopper structure of the sun roof device according to claim 8,
wherein the biasing means is provided with a spring portion formed on the connecting link and pressed by the front slider.

* * * * *